United States Patent
Ishikawa et al.

(10) Patent No.: US 9,534,671 B2
(45) Date of Patent: Jan. 3, 2017

(54) CHAIN GUIDE

(71) Applicant: TSUBAKIMOTO CHAIN CO., Osaka-shi, Osaka (JP)

(72) Inventors: Yuichiro Ishikawa, Osaka (JP); Yuji Kurematsu, Osaka (JP)

(73) Assignee: TSUBAKIMOTO CHAIN CO., Osaka-shi (JP)

( * ) Notice: Subject to any disclaimer, the term of this patent is extended or adjusted under 35 U.S.C. 154(b) by 267 days.

(21) Appl. No.: 14/183,790

(22) Filed: Feb. 19, 2014

(65) Prior Publication Data

US 2014/0248983 A1    Sep. 4, 2014

(30) Foreign Application Priority Data

Mar. 4, 2013   (JP) .................. 2013-042168

(51) Int. Cl.
 *F16H 7/18* (2006.01)
(52) U.S. Cl.
 CPC ........... *F16H 7/18* (2013.01); *F16H 2007/185* (2013.01)
(58) Field of Classification Search
 CPC ............................. F16H 7/18; F16H 2007/185
 USPC ................................................. 474/111, 140
 See application file for complete search history.

(56) References Cited

U.S. PATENT DOCUMENTS

| | | | |
|---|---|---|---|
| 5,961,411 A * | 10/1999 | Tsutsumi et al. | 474/111 |
| 7,740,554 B2 * | 6/2010 | McGarry | 474/144 |
| 7,967,708 B2 | 6/2011 | Hayami et al. | |
| 2002/0193192 A1 | 12/2002 | Inoue et al. | |
| 2005/0159260 A1 * | 7/2005 | Gogo | 474/111 |
| 2010/0210384 A1 | 8/2010 | Young et al. | |
| 2012/0015769 A1 | 1/2012 | Adams | |
| 2014/0057749 A1 * | 2/2014 | Konno et al. | 474/111 |
| 2015/0024889 A1 * | 1/2015 | Konno et al. | 474/111 |
| 2015/0204218 A1 * | 7/2015 | Utaki | 474/140 |
| 2015/0344105 A1 * | 12/2015 | McGarry | 474/140 |

FOREIGN PATENT DOCUMENTS

| | | |
|---|---|---|
| CN | 101358643 A | 2/2009 |
| JP | 10-089428 A | 4/1998 |
| JP | 2002-372111 A | 12/2002 |
| JP | 2012-521527 A | 9/2012 |
| WO | 2010-59698 A1 | 5/2010 |

\* cited by examiner

*Primary Examiner* — William E Dondero
*Assistant Examiner* — Robert T Reese
(74) *Attorney, Agent, or Firm* — Westerman, Hattori, Daniels & Adrian, LLP

(57) ABSTRACT

The occupation space of a chain inside an engine room can be reduced, while the necessary strength, rigidity, and durability are maintained, the sheet thickness can be decreased, the number of production steps and material waste can be reduced, stress concentration and strains during bending and fixing can be reduced, load offset during fixing and loosening of bolts or the like can be prevented, the increase in vibrations and noise during the use can be prevented, the maintenance operation load can be reduced, and utility can be increased with a simple configuration. A chain guide is provided with a base member supporting a guide shoe. The base member has a base mounting portion and base wall portions formed to sandwich the guide shoe from both sides in a width direction. The guide shoe has a guide shoe mounting portion at a position apart from the base mounting portion in the chain running direction.

8 Claims, 19 Drawing Sheets

CHAIN GUIDE

BACKGROUND OF THE INVENTION

1. Field of the Invention

The present invention relates to a chain guide including a guide shoe slidingly guiding a running chain and a base member supporting the guide shoe along a chain running direction.

2. Description of the Related Art

A chain guide provided with a guide shoe that slidingly guides a running chain is commonly used for stabilizing the chain that runs between sprockets and maintaining the correct chain tension.

For example, FIG. 16 shows a well-known timing system of an engine in which a transmission chain CH such as an endless suspended roller chain is caused to run between sprockets S1, S2 provided at a crankshaft and a camshaft, respectively, inside an engine room. The timing chain CH is endless suspended between the drive sprocket S1 mounted on the crankshaft inside the engine room E and a pair of driven sprockets S2 mounted on the camshaft, and the timing chain CH is guided by a swinging guide G and a chain guide 500 (fixed guide).

In such a well-known timing system, the chain guide 500 is fixed inside the engine room E by two mounting shafts B1, B2, and the swinging guide G is mounted inside the engine room such as to be capable of swinging in the suspension plane of the timing chain CH about the swinging shaft B0 as a center.

A chain tensioner T maintains the correct tension of the timing chain CH and inhibits vibrations by applying pressure to the swinging guide G.

In the chain guide used in such a well-known timing system, the running guide portion is preferably configured of a low-friction wear-resistant material, and a chain guide entirely configured of a low-friction resin material is known.

However, the fixed chain guide should be strong, rigid, and durable enough to ensure stable guiding against the tension and vibrations of the chain, and when the chain guide is configured only from a resin material, the material thickness should be increased to obtain the necessary strength, rigidity, and durability, and the space occupied by the chain guide inside the engine room increases.

Accordingly, a configuration is known (Japanese Patent Application Publication No. H10-89428) in which only the running guide portion is formed from a low-friction resin material, and this resin material is supported by a material with high strength, rigidity, and durability, such as a metal, thereby reducing the occupation space, while ensuring the strength, rigidity, and endurance necessary for the chain guide as a whole.

For example, as shown in FIGS. 17 to 19, the well-known chain guide 500 includes a guide shoe 510 made from a resin and slidingly guiding a running chain and a base member 520 made from a metal and supporting the guide shoe 510 along a chain running direction.

The base member 520 is constituted by a shoe support portion 521 extending in the chain running direction and base mounting portions 522 extending vertically at positions set apart with respect to the chain running direction. The two base mounting portions 522 are formed by bending at 90° with respect to the shoe support portion 521 from an integral metal sheet.

The two base mounting portions 522 are each provided with a mounting hole 523 for inserting a fixing member such as a pin or a shoulder bolt.

The guide shoe 510 is configured such that a running guide portion 511 is supported by the shoe support portion 521 of the base member 520, and end locking pieces 512 at both ends in the chain running direction and a plurality of side locking pieces 513 provided at appropriate locations in a width direction can be fitted by locking to the shoe support portion 521 and detached.

A lip 519 for introducing the chain so that the chain could be correctly mounted along the running guide portion 511 when the chain is assembled and for controlling the chain movement in the width direction when the chain is used is provided at each side of the running guide portion 511.

SUMMARY OF THE INVENTION

In the above-described well-known chain guide, the shoe support portion 521 and two base mounting portions 522 are formed by bending the base member 520 at 90° at two locations of an integral metal sheet. The resultant problem is that where the accuracy of the two bent portions is low, strains appear in the base member 520 when it is fixed with bolts or the like to an engine or the like, the bolts can get loose and fall out due to running or engine vibrations, and cracks or fractures can appear in the base member 520 itself.

Where the bending processing is performed with a high accuracy to avoid the aforementioned problem, the production cost rises.

Further, in the boundary zone of the shoe support portion 521 and the vicinity of the center of the two base mounting portions 522, which are constituted by the integral metal sheet of the base member 520, internal stresses are concentrated during the bending operation and stress concentration easily occurs during the use. The resultant problem is that cracks and breaks easily occur and the sheet thickness should be increased. Further, since the two base mounting portions 522 constituted by the integral metal sheet of the base member 520 are present at the same side surface, the pushing pressure of the chain creates a cantilever support during the use, thereby creating a load offset and also making it necessary to increase the sheet thickness in order to ensure a sufficient support. Further, since the two base mounting portions 522 should be fixed with bolts or the like to the engine, vibrations or noise generated in the base member 520 by the running chain are easily transmitted to the engine, and vibrations or noise of the entire engine are increased.

Furthermore, when the chain guide is used with a configuration with a different spacing of fixing portions inside an engine, a different base member 520 having two base mounting portions 522 should be used. The resultant problem is that specifications of a punching die or bending machine should be changed, which requires time and increases cost, and the degree of design freedom is low.

In addition, since the two base mounting portions 522 are provided at a single base member 520, it is difficult to share the base between engines with different mounting pitches.

Further, a difference in size unavoidably occurs at the production stage between the distance between the mounting holes 523 of the two base mounting portions 522 and the distance between the fixing portions inside the engine, and those distances can also change under the effect of temperature. Therefore, a configuration is typically used that allows for small differences in the mounting structure, more specifically, at least one of the mounting holes 523 is formed as an elongated hole, in order to enable the mounting that allows for such differences.

The same problem is also inherent to other conventional chain guides having two or more mounting portions, such as the above-mentioned chain guide that is entirely constituted by a low-friction resin material.

When the chain guide is fixed by inserting a bolt or the like into the elongated mounting hole, the fixing tool such as a bolt slightly moves inside the elongated hole due to the difference in expansion-shrinkage amount between the chain guide and the engine block caused by temperature variations during the use or due to small deformations of the chain guide caused by tension variations or vibrations in the chain. Therefore, the fixing becomes loose and vibrations and noise are increased in a long-term use. In the worst case, the chain guide falls off inside the engine room, and the frequency of maintenance operations should be increased to alleviate this problem.

It is an object of the present invention to provide a chain guide configured of a plurality of members and fixed by a plurality of mounting portions in which the above-described problems are resolved with a structure such that the plurality of mounting portions is dispersed to a plurality of members, instead of being provided at a single member, and such that does not require a high accuracy of mounting portions, and in which the occupation space inside an engine room is reduced with a simple configuration, while maintaining the necessary strength, rigidity, and durability, sheet thickness can be decreased, the number of production steps and material waste can be reduced, stress concentration and strains during bending and fixing can be reduced, load offset during fixing and loosening of bolts can be prevented, the increase in vibrations and noise during the use can be prevented, the maintenance operation load can be reduced, and utility can be increased.

The present invention resolves the above-described problems with a chain guide including: a guide shoe slidingly guiding a running chain; and a base member supporting the guide shoe along a chain running direction, wherein the base member is constituted by a shoe support portion extending in the chain running direction and a base mounting portion extending perpendicular to the chain running direction, the guide shoe is constituted by a running guide portion extending in the chain running direction and a guide shoe mounting portion extending perpendicular to the chain running direction at a position apart from the base mounting portion in the chain running direction, and base wall portions formed to sandwich the guide shoe from both sides in a width direction are provided at both sides, in the width direction, of the shoe support portion.

With the guide chain according to claim 1, the base member contributing to strength, rigidity, and durability is formed from a material other than that of the guide shoe and the occupation space can be reduced. Further, since the base member and the guide shoe are fixed separately, each at a respective location, by the base mounting portion and guide shoe mounting portion, respectively, the base member is not required to receive the entire load by a cantilever support only on one surface side, load offset during the use is prevented, strains appear neither in the guide shoe, nor in the base member, the base member is not required to be thick, bolts are prevented from loosening and falling off due to running and ending vibrations, and no cracks or fractures occur.

Further, since the base wall portions formed to sandwich the guide shoe from both sides in a width direction are provided at both sides, in the width direction, of the shoe support portion, there is no boundary portion with the shoe support portion close to the center of the base mounting portion, there is no portion in which the internal stresses are concentrated during the bending processing or stress concentration occurs during the use, and the sheet thickness can be decreased.

Further, since the base member and the guide shoe are allowed to shift slightly relative to each other only in the chain running direction, even when a difference in the expansion-contraction amount occurs which is caused by temperature variations during the use or a deformation caused by tension variations or vibrations of the chain, no displacement is generated in either of the mounting portions, the fixing is not loosened even in a long-term use, the increase in vibrations and noise during the use can be prevented, and the maintenance operation load can be reduced.

In addition, by changing only the guide shoe, it is possible to share the base member between engines with different mounting pitches, and the utility is increased.

Furthermore, since the base wall portions formed to sandwich the guide shoe from both sides in the width direction are provided at both sides of the shoe support portion in the width direction, the mounting structure of the base member and guide shoe can be simplified.

Since the lips that have been provided in the running guide portion of the conventional guide shoe are replaced by the base wall portions, the chain can be introduced such as to be correctly mounted along the running guide portion of the guide shoe during the assembling process. Therefore, the lip height and width can be reduced within a range in which the chain movement in the width direction can be regulated and the guide shoe width can be reduced, thereby making it possible to reduce the width of the entire chain guide and the space occupied thereby.

By fixing the guide shoe and the base member separately from each other, it is possible to adapt the configuration to design changes in the engine, on which the chain guide is to be mounted, those design changes resulting in a different position of a pin or a shoulder bolt or a different height of the mounting surface, by changing only either of the guide shoe and the base member, without changing the entire chain guide. Therefore, the cost of design change is reduced and utility is increased.

With the configuration described in claim 2, since the guide shoe is formed from a synthetic resin material, the friction of the running guide portion can be reduced and the molding thereof can be facilitated. Since the base member is formed from a metal material, sufficient strength, rigidity, and durability can be maintained while reducing the occupied space thereof.

With the configuration described in claim 3, the base member can be easily formed by punching from a metal sheet and the base mounting portions and base wall portions can be formed by bending. Therefore, the production is facilitated.

With the configuration described in claim 4, the base mounting portions are provided parallel to each other at both sides in the width direction. Therefore, the mounting angle of the base member is accurately regulated by inserting the fixing member such as a pin through the base mounting portions at both sides. As a result, no high accuracy is required during bending and the production cost can be reduced.

Further, since no strong fixing with bolts or the like is necessary, vibrations or noise of the base member generated when the chain is running are prevented from being transferred to the engine, and vibrations and noise of the entire engine are also reduced.

With the configuration described in claim 5, since a projecting mounting hole with an edge portion projected in the insertion direction is provided in the base mounting portion, the base mounting portion can be fixed even more stably when a fixing member such as a pin is inserted therethrough.

Further, the chain guide can be adapted to configurations, such as engines, with different distances to the mounting surface by changing only the protrusion dimension of the edge portion. When the mounting hole is produced by punching a metal material, the projecting mounting hole can be formed simultaneously with the punching process, without adding a special processing step. Therefore, the degree of design freedom is increased.

With the configuration described in claim 6, since a mounting locking groove that can be locked to a circumferential surface of a fixing member, such as a pin, which is used for mounting is provided in the guide shoe mounting portion, the guide shoe can be formed in a more compact shape and the occupation space thereof can be further reduced.

With the configuration described in claim 7, since the guide shoe and the base member are configured to be mateable with each other and detachable from each other, the production by assembling is facilitated, the replacement during maintenance after the use can be performed in respective component units, the maintenance operation is also facilitated, and the cost is reduced.

With the configuration described in claim 8, the distance between the base mounting portion and the guide shoe mounting portion can be randomly set, the difference in size with the object to which the fixing should be performed, such as an engine, can be easily absorbed and the mounting operation is facilitated.

Further, when the base member or the guide shoe are extended or contracted due to temperature variations or deformed by changes in tension of vibrations of the chain during chain usage, those deformations can be relieved by changing the force acting in the chain running direction relatively, no concentrated stresses are applied to a specific location, and durability can be further increased.

In addition, no concentrated stresses are applied to the base mounting portion or the guide shoe mounting portion, the fixed components can be reliably prevented from loosening, vibrations and noise can be prevented from increasing during the use, and the maintenance operation load can be reduced.

DESCRIPTION OF THE PREFERRED EMBODIMENTS

The present invention is based on the technical idea of using a structure in which when a configuration constituted by a plurality of members is fixed by a plurality of mounting portions, the plurality of mounting portions is dispersed among the plurality of members, instead of being provided at one member, and high accuracy of the mounting portions is not required. Thus, the present invention provides a chain guide including a guide shoe slidingly guiding a running chain and a base member supporting the guide shoe along a chain running direction, wherein the base member is constituted by a shoe support portion extending in the chain running direction and a base mounting portion extending perpendicular to the chain running direction; the guide shoe is constituted by a running guide portion extending in the chain running direction and a guide shoe mounting portion extending perpendicular to the chain running direction at a position apart from the base mounting portion in the chain running direction; and base wall portions formed to sandwich the guide shoe from both sides in a width direction are provided at both sides, in the width direction, of the shoe support portion, and such a chain guide may have any specific features, provided that the occupation space thereof inside an engine room can be reduced, while the necessary strength, rigidity, and durability are maintained, the sheet thickness can be decreased, the number of production steps and material waste can be reduced, stress concentration and strains during bending and fixing can be reduced, load offset during fixing and loosening of bolts or the like can be prevented, the increase in vibrations and noise during the use can be prevented, the maintenance operation load can be reduced, and utility can be increased with a simple configuration.

The base member is desirably from a metal material and is particularly preferred to be manufactured from a rolled steel sheet, but a well-known and appropriate material may be also selected according to the conditions such as rigidity, durability, formability, and cost.

It is desirable that the material of the guide shoe be a synthetic resin, but a well-known and appropriate material may be also selected according to the conditions such as friction resistance, rigidity, durability, formability, and cost.

EXAMPLE 1

A chain guide 100 (fixed guide) according to the first embodiment of the present invention will be explained hereinbelow with reference to the appended drawings.

Figure 1:
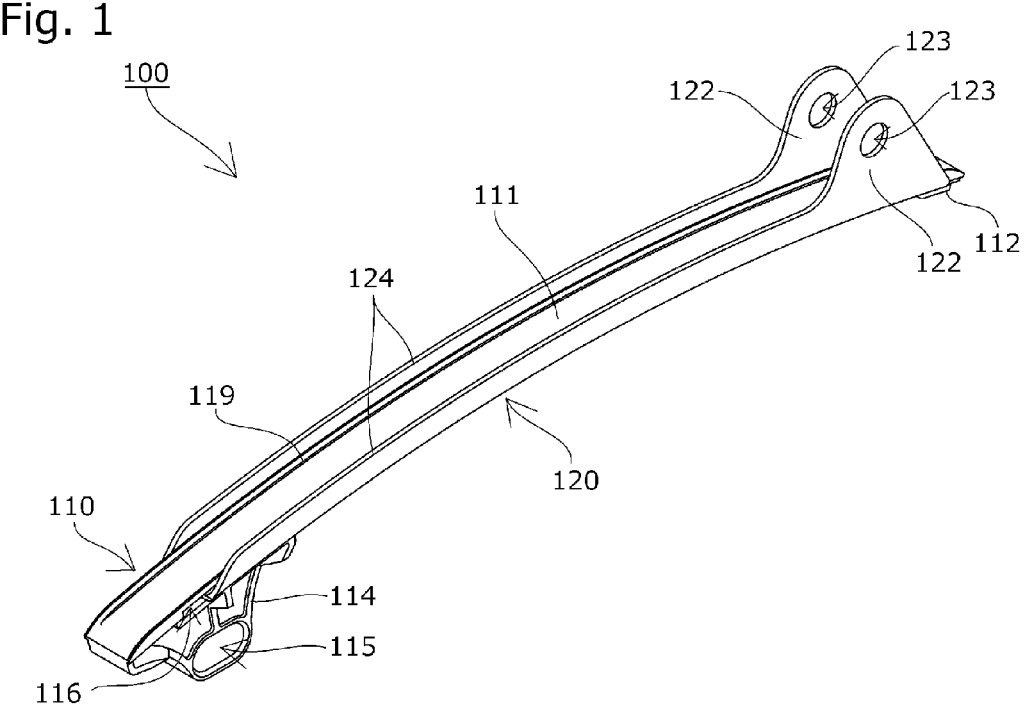
FIG. 1 is a perspective top view of the chain guide according to the first embodiment of the present invention.
Figure 2:
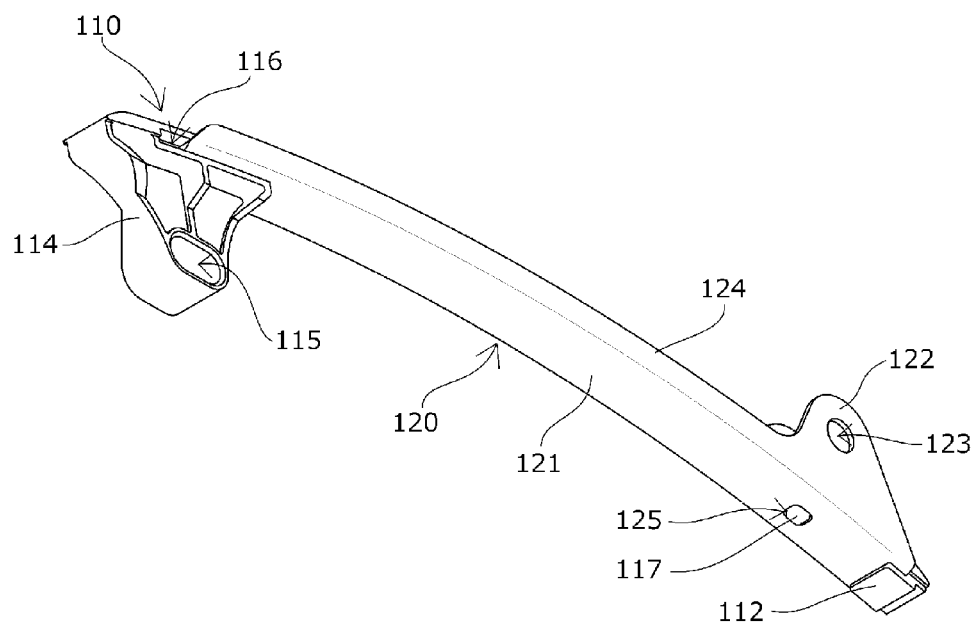
FIG. 2 is a perspective bottom view of the chain guide according to the first embodiment of the present invention.
Figure 3:
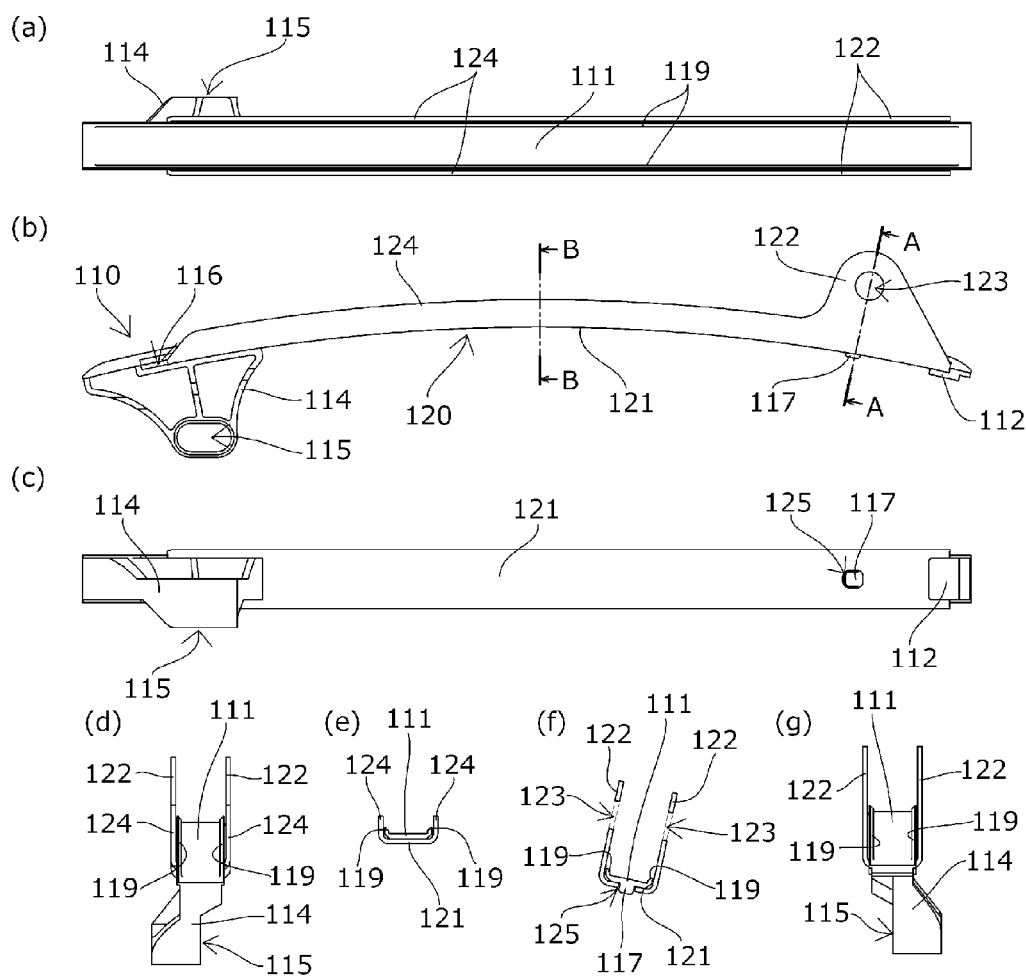
FIG. 3A, FIG. 3B, FIG. 3C, FIG. 3D, FIG. 3E, FIG. 3F, and FIG. 3G are respectively a plan view, a front view, a bottom view, a left view, a B-B sectional view, an A-A sectional view, and a right view of the chain guide according to the first embodiment of the present invention.

The chain guide 100 is suitable for the above-described well-known timing system and includes, as shown in FIGS. 1 to 3, a guide shoe 110 slidingly guiding a running chain and a base member 120 supporting the guide shoe 110 along the chain running direction.

The base member 120 includes a shoe support portion 121 extending in the chain running direction, two parallel base mounting portions 122 extending vertically to the chain running direction from both sides in the width direction, and two parallel base wall portions 124 provided at both sides in the width direction. The base member is formed by punching from a single rolled steel sheet and then bending the base mounting portions 122 and base wall portions 124 at 90° with respect to the shoe support portion 121.

A mounting hole 123 for inserting a fixing member such as a pin for fixing inside an engine room is provided in either of the two parallel base mounting portions 122. The shoe support portion 121 is provided with a predetermined curved shape along the chain running direction.

The guide shoe 110 is constituted by a running guide portion 111 extending along the chain running direction, and a guide shoe mounting portion 114 extending perpendicular to the chain running direction at a position apart from the base mounting portion 122 in the chain running direction. The guide shoe is formed integrally, for example by injection molding, by using a synthetic resin material.

The guide shoe mounting portion 114 is formed to extend to the rear surface side downstream of the running guide portion 111, provided with a mounting hole 115 for inserting a fixing member such as a pin for fixing inside the engine room, and reinforced by a rib for maintaining strength and rigidity.

Further, a fitting groove 116 into which the shoe support portion 121 of the base member 120 can be inserted and fitted from the chain running direction is provided in the guide shoe mounting portion 114. A locking projection 117 for engaging with an engagement hole 125 provided in the upper surface of the shoe support portion 121 and an end engagement piece 112 for engaging with an upstream end section of the shoe support portion 121 are provided at the rear surface side of the running guide portion 111. In a state in which the rear surface of the guide shoe 110 is supported by the base member 120, the two can be mated with each other to be displaceable in the chain running direction and detached from each other.

Lips 119 for controlling the chain movement in the width direction during the use are provided at both sides of the running guide portion 111.

In the present embodiment, the rightward direction in FIGS. 1 to 3 is to the upstream side in the chain running direction, and the leftward direction is to the downstream side in the chain running direction. The chain running surface side of the running guide portion 111 is taken as a front surface side and the surface opposite thereto is taken as a rear surface side.

In the present embodiment, the locking projection 117 is provided in one location in the central portion in the width direction on the upstream side, but the number, shape, and positions of the locking projections may be changed, as appropriate, with consideration for easiness of mounting and detachment during assembling and maintenance.

In the chain guide 100 of the present embodiment that has the above-described configuration, the guide shoe 110 made from a low-friction synthetic resin is supported by the metallic base member 120 contributing to strength, rigidity and endurance. As a result, the space occupied inside the engine room where the chain guide is to be fixed can be reduced. Furthermore, since the base member 120 is fixed by the base mounting portions 122 and the guide shoe 110 is fixed by the guide shoe mounting portion 114 at respective separate locations, strains occur neither in the guide shoe 110 nor in the base member 120, bolts are not loosened and do not fall out due to running or engine vibrations, and the occurrence of cracks and fractures is prevented.

Further, mating and detachment can be performed in a state in which the rear surface of the guide shoe 110 is supported by the base member 120 and the base wall portions 124 sandwich the running guide portion 111 of the guide shoe 110 from both sides in the width direction. Since the base member 120 and the guide shoe 110 are fixed separately by the base mounting portions 122 and the guide shoe mounting portion 114, respectively, the base member 120 and the guide shoe 110 are allowed to shift slightly relative to each other only in the chain running direction, and even when a difference in the expansion-contraction amount occurs due to temperature variations during the use or a deformation caused by tension variations or vibrations of the chain, no displacement is generated in either of the mounting portions, the fixing is not loosened even in a long-term use, the increase in vibrations and noise during the use can be prevented, and the maintenance operation load can be reduced.

Further, the mounting structure of the base member 120 and guide shoe 110 can be simplified by providing the base wall portions 124 formed to sandwich the guide shoe 110 from both sides in the width direction at both sides of the shoe support portion 121 in the width direction.

The base mounting portions 122 are provided parallel to each other at both sides in the width direction. The mounting hole 123 is provided in each of the base mounting portions. The base member 120 can be stably fixed by inserting a fixing member such as a pin through the mounting holes 123 at both sides, high accuracy is not required for bending, and the production cost can be reduced.

Further, since the base wall portion 124 is provided as a continuation of the base mounting portions 122, there is no boundary portion with the shoe support portion 121 close to the center of the base mounting portion 122, and there is no portion in which the internal stresses are concentrated during the bending processing or stress concentration easily occurs during the use. As a result, cracks and breaks are unlikely to occur and the sheet thickness can be decreased.

Further, since the lips that have been provided in the running guide portion of the conventional guide shoe are replaced by the base wall portions 124, the chain can be introduced such as to be correctly mounted along the running guide portion 111 of the guide shoe 110 during the assembling process. Therefore, the lip 119 of the guide shoe 110 may regulate the chain movement in the width direction. As a result, the lip can be designed to have very small height and width, the width of the guide shoe 110 can be small, the width of the entire chain guide 100 can be small, and the space occupied thereby can be reduced.

Further, in the present embodiment, the base wall portions 124 are provided as continuations of the base mounting portions 122 as far as a downstream side, but the base wall portions may be extended to an intermediate portion and may have different lengths on the left and right side.

By changing only the guide shoe 110, it is possible to share the base member 120 among the engines with different mounting pitches.

Figure 4:
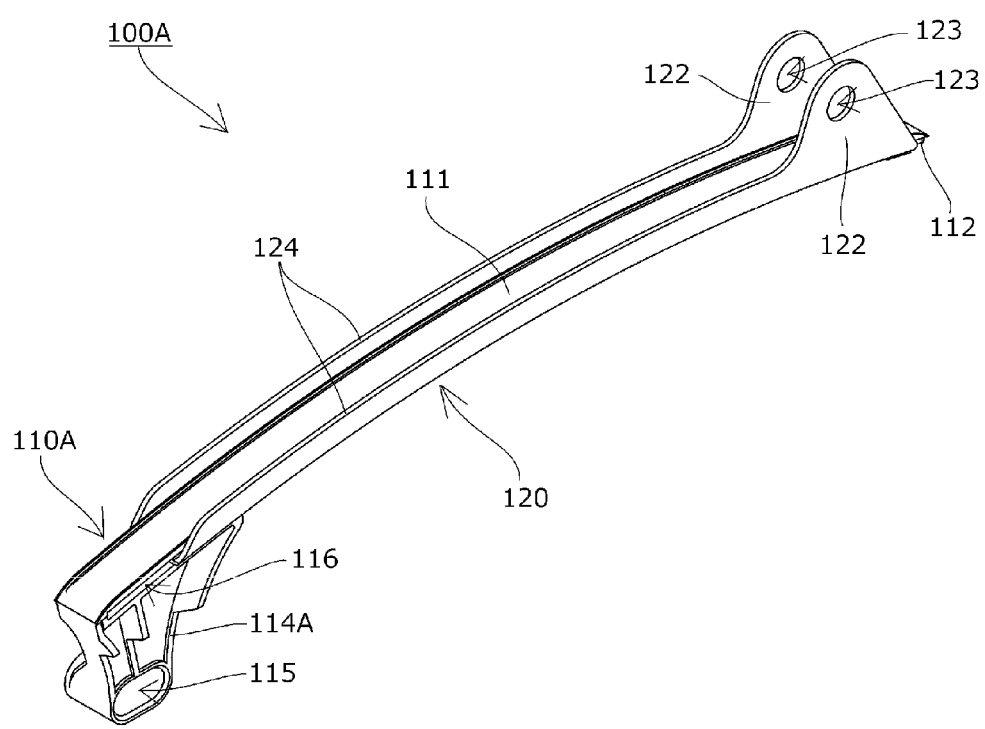
FIG. 4 is a perspective top view of the chain guide according to a variation example of the first embodiment of the present invention.
Figure 5:
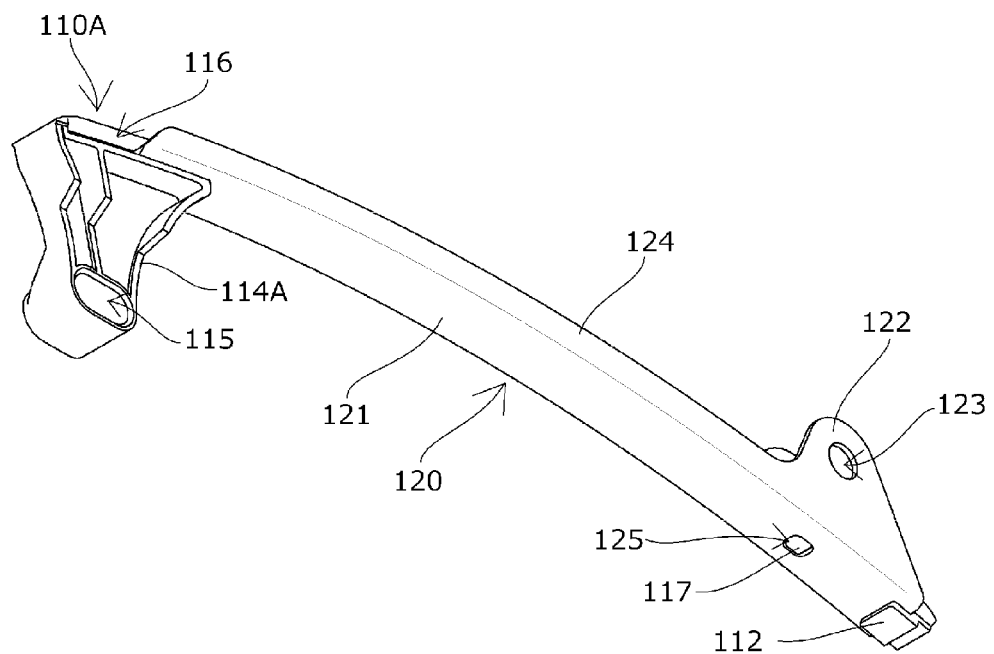
FIG. 5 is a perspective bottom view of the chain guide according to the variation example of the first embodiment of the present invention.
Figure 6:
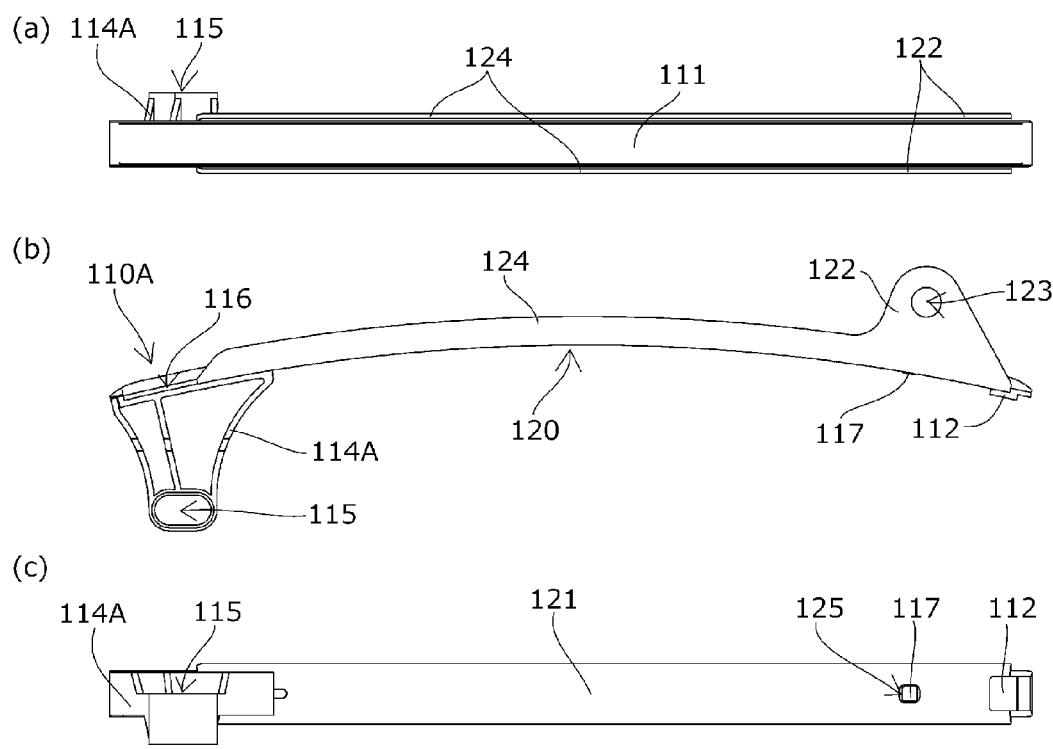
FIG. 6A, FIG. 6B, and FIG. 6C are respectively a plan view, a front view, and a bottom view of the chain guide according to the variation example of the first embodiment of the present invention.

The chain guide 100A according to a variation example of the first embodiment of the present invention is suitable, for example, for the configuration in which the position of the pin on the guide shoe side in the engine on which the mounting portion is to be mounted is changed. As shown in FIGS. 4 to 6, a guide shoe mounting portion 114A of the guide shoe 110A is formed such that the position of the mounting hole 115 is farther and on the downstream side with respect to the position of the mounting hole 115 of the chain guide 100 according to the first embodiment.

By contrast, the base member 120 is identical to the base member 120 of the chain guide 100 of the above-described first embodiment (components same as those of the chain guide 100 of the first embodiment are assigned with same reference numerals and the explanation thereof is herein omitted).

Thus, by fixing the guide shoe 110A and the base member 120 separately from each other, it is possible to adapt the configuration to design changes of the engine, on which the chain guide is to be mounted, those design changes resulting in a different position of a pin or a shoulder bolt or a different height of the mounting surface, by changing only the guide shoe 110A to the above-described guide shoe 110. Therefore, the cost of design change is reduced and utility is increased.

EXAMPLE 2

A chain guide 200 (fixed guide) according to the second embodiment of the present invention will be explained below with reference to the appended drawings.

Figure 7:
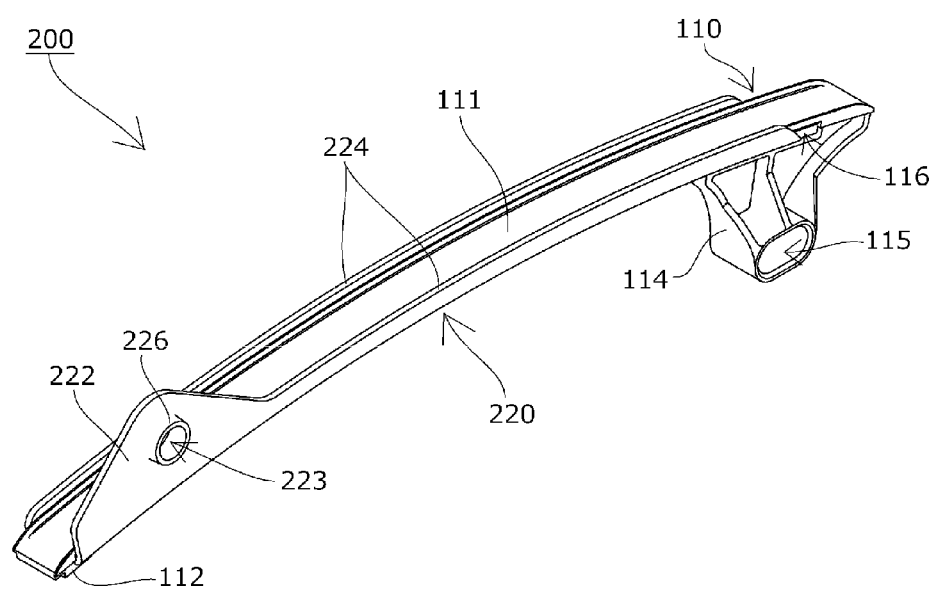
FIG. 7 is a perspective top view of the chain guide according to the second embodiment of the present invention.
Figure 8:
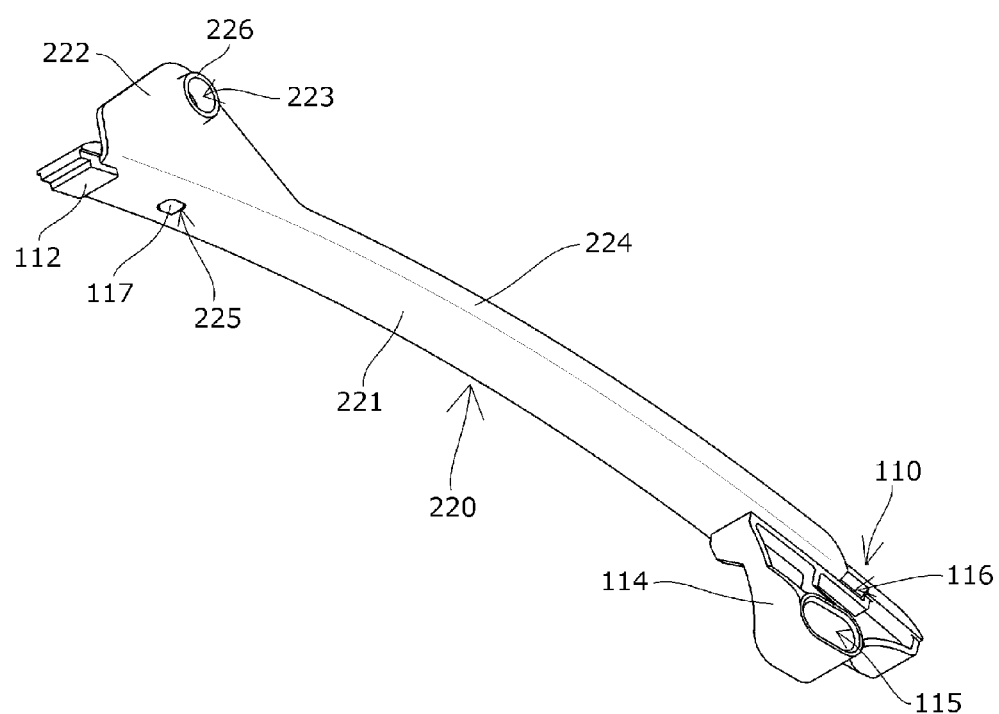
FIG. 8 is a perspective bottom view of the chain guide according to the second embodiment of the present invention.
Figure 9:
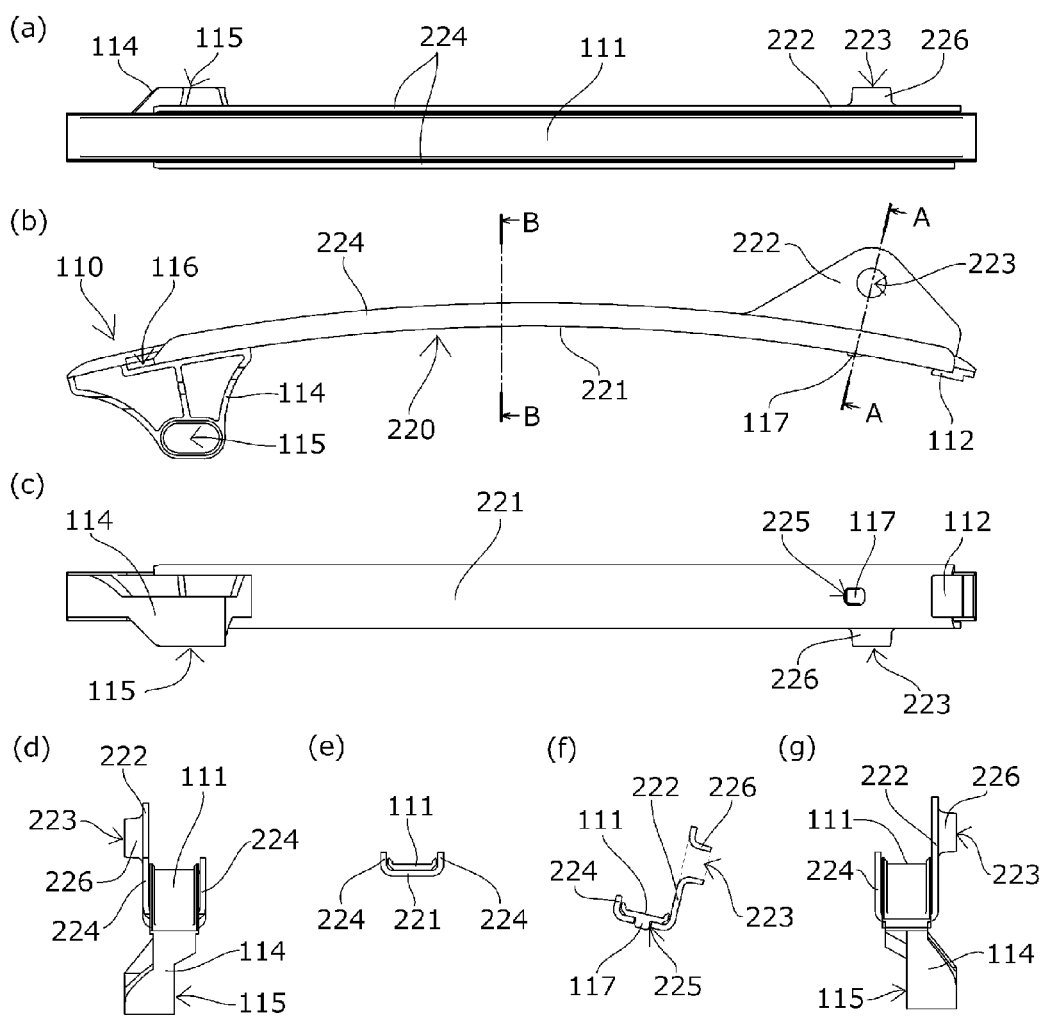
FIG. 9A, FIG. 9B, FIG. 9C, FIG. 9D, FIG. 9E FIG. 9F, and FIG. 9G are respectively a plan view, a front view, a bottom view, a left view, a B-B sectional view, an A-A sectional view, and a right view of the chain guide according to the second embodiment of the present invention.

As shown in FIGS. 7 to 9, the chain guide 200 includes the guide shoe 110 slidingly guiding a running chain and a base member 220 supporting the guide shoe 110 along the chain running direction.

The base member 220 includes a shoe support portion 221 extending in the chain running direction, a base mounting portions 222 extending vertically with respect to the chain running direction from one side in the width direction, and two parallel base wall portions 224 provided at both sides in the width direction. The base member is formed by punching from a single rolled steel sheet and then bending the base mounting portion 222 and base wall portions 224 at 90° with respect to the shoe support portion 221.

A projecting mounting hole 223 having a cylindrical projecting portion 226 for inserting a fixing member such as a pin for fixing inside an engine room is provided in the base mounting portion 222. The shoe support portion 221 is imparted with a predetermined curved shape along the chain running direction.

The guide shoe 110 is identical to the guide shoe 110 of the chain guide 100 of the above-described first embodiment (components same as those of the chain guide 100 of the first embodiment are assigned with same reference numerals and the explanation thereof is herein omitted).

With the chain guide 200 according to the present embodiment that has the above-described configuration, the structural components same as those of the chain guide 100 according to the above-described first embodiment demonstrate the same operation effect. Further, since the projecting mounting hole 223 of the base mounting portion 222 has a cylindrical portion of a predetermined length, when a fixing member such as a pin is inserted therein, the base member 220 can be stably fixed.

Further, even when the position of the mounting surface of the engine on which the mounting portion is to be mounted is offset in the width direction of the chain, it can be adjusted by the height of the projecting portion 226, and since the projecting portion 226 can be initially processed at the same time as the base member 220 is punched out from a single rolled steel sheet, an additional operation such as subsequent bending for offsetting the base mounting portion 222 is not required and the production is easy.

EXAMPLE 3

A chain guide 300 (fixed guide) according to the third embodiment of the present invention will be explained hereinbelow with reference to the appended drawings.

Figure 10:
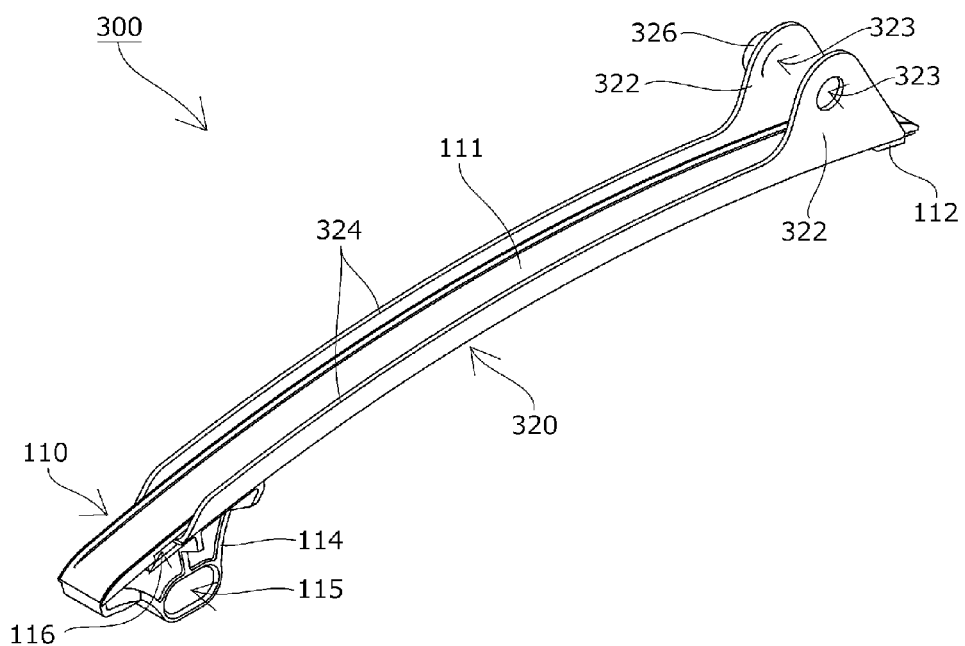
FIG. 10 is a perspective top view of the chain guide according to the third embodiment of the present invention.
Figure 11:
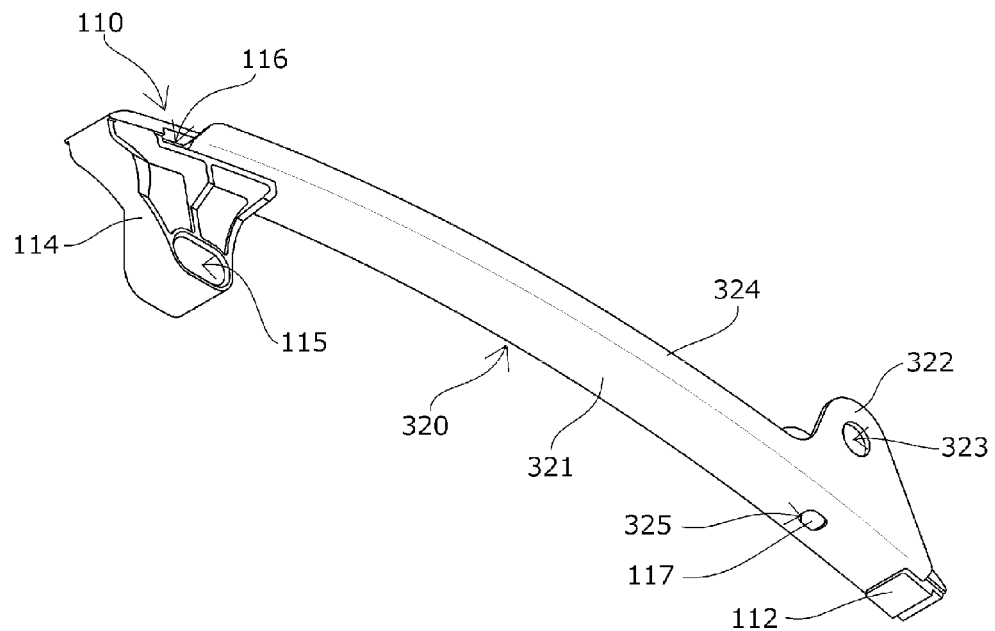
FIG. 11 is a perspective bottom view of the chain guide according to the third embodiment of the present invention.
Figure 12:
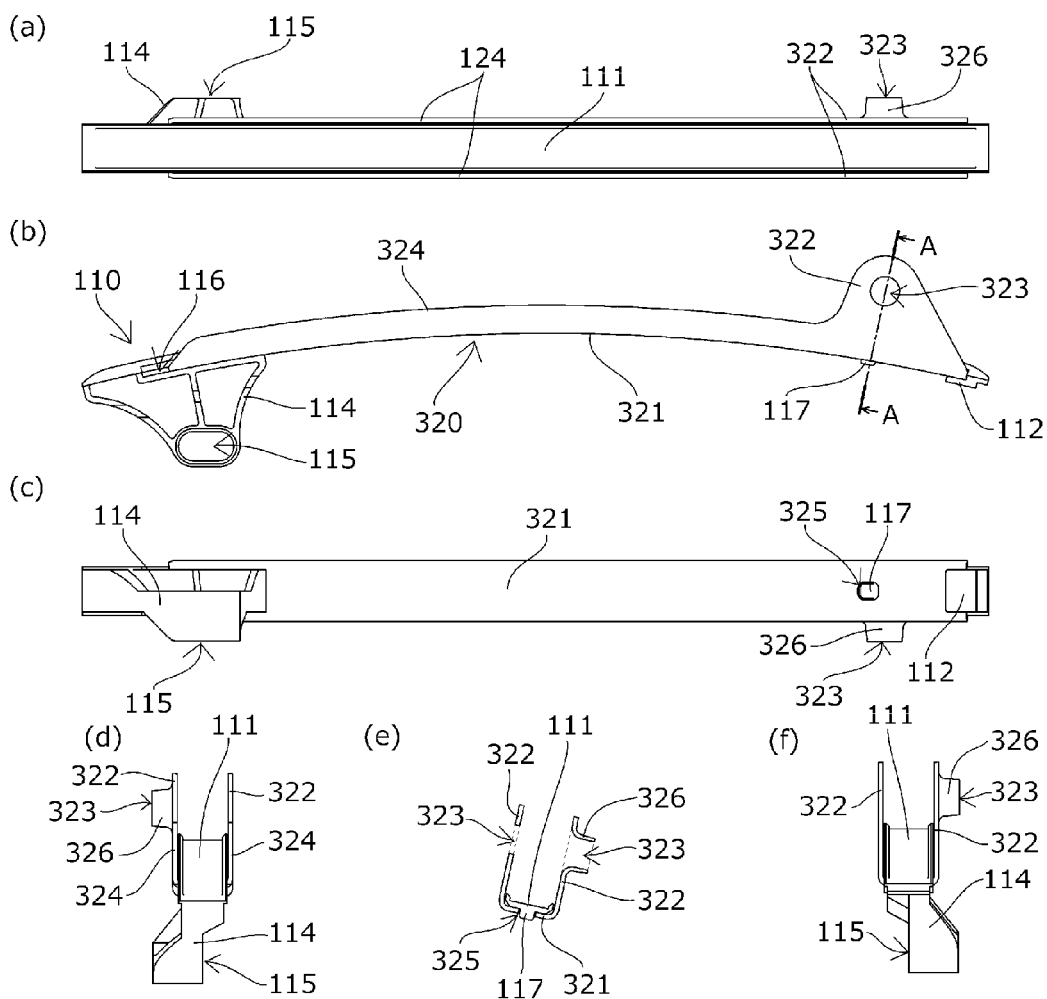
FIG. 12A, FIG. 12B, FIG. 12C, FIG. 12D, FIG. 12E, and FIG. 12F are respectively a plan view, a front view, a bottom view, a left view, an A-A sectional view, and a right view of the chain guide according to the third embodiment of the present invention.

As shown in FIGS. 10 to 12, the chain guide 300 includes the guide shoe 110 slidingly guiding a running chain and a base member 320 supporting the guide shoe 110 along the chain running direction.

The base member 320 includes a shoe support portion 321 extending in the chain running direction, two parallel base mounting portions 322 extending vertically to the chain running direction from both sides in the width direction, and two parallel base wall portions 324 provided at both sides in the width direction. The base member is formed by punching from a single rolled steel sheet and then bending the base mounting portions 322 and base wall portions 324 at 90° with respect to the shoe support portion 321.

A projecting mounting hole 323 having a cylindrical projecting portion 326 for inserting a fixing member such as a pin for fixing inside an engine room is provided in the base mounting portion 322 on the mounting surface side inside the engine room, from among the two parallel base mounting portions 322. A mounting hole 323 having no projecting portion is provided in the base mounting portion 322. The shoe support portion 321 is provided with a predetermined curved shape along the chain running direction.

The guide shoe 110 is identical to the guide shoe 110 of the chain guide 100 of the above-described first embodiment (components same as those of the chain guide 100 of the first embodiment are assigned with same reference numerals and the explanation thereof is herein omitted).

With the chain guide 300 according to the present embodiment that has the above-described configuration, the structural components same as those of the chain guide 100 according to the above-described first embodiment demonstrate the same operation effect. Further, since the projecting mounting hole 323 of the base mounting portion 322 has a cylindrical portion of a predetermined length, when a fixing member such as a pin is inserted therein, the base member 320 can be stably fixed, in the same manner as in the chain guide 200 of the above-described second embodiment.

Further, even when the position of the mounting surface of the engine on which the mounting portion is to be mounted is offset in the width direction of the chain, the adjustment can be performed by the height of the projecting portion 326, and since the projecting portion 326 can be initially processed at the same time as the base member 320 is punched out from a single rolled steel sheet, an additional operation such as subsequent bending for offsetting the base mounting portion 322 is not required after punching and the production is easy.

Further, the base mounting portions 322 are provided parallel to each other at both sides in the width direction, in the same manner as in the chain guide 100 according to the above-described first embodiment, the mounting hole and projecting mounting hole 323 are provided in respective base mounting portions, the base member 320 can be stably fixed by inserting a fixing member such as a pin into the mounting hole and projecting mounting hole 323 at both sides, a high accuracy is not required for the bending processing, and the production cost can be reduced.

EXAMPLE 4

A chain guide 400 (fixed guide) according to the fourth embodiment of the present invention will be explained hereinbelow with reference to the appended drawings.

Figure 13:
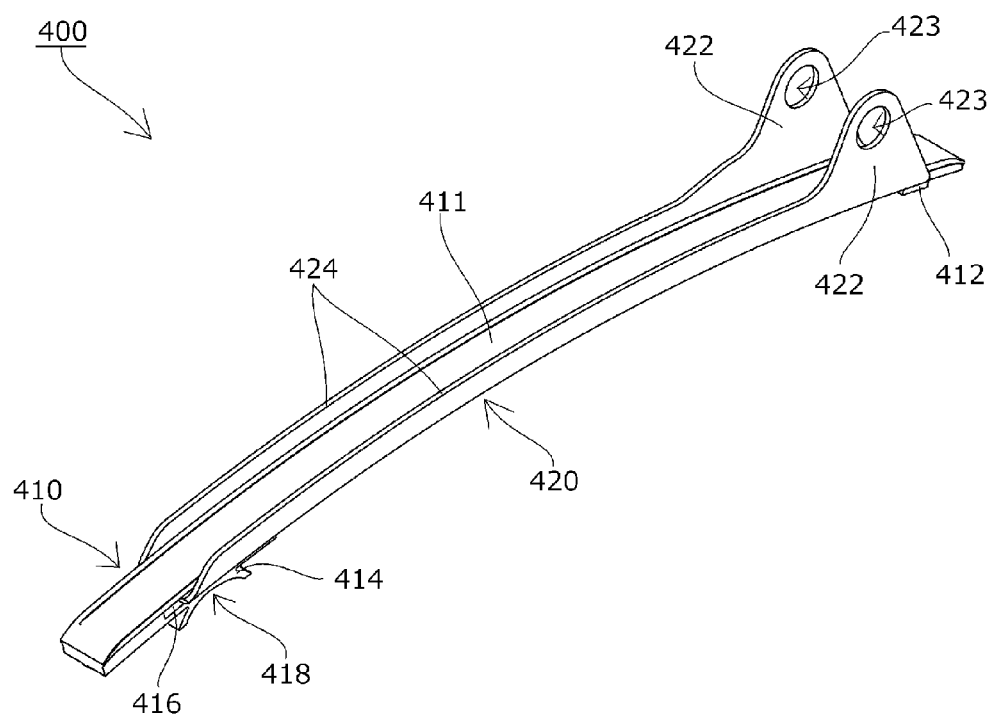
FIG. 13 is a perspective top view of the chain guide according to the fourth embodiment of the present invention.
Figure 14:
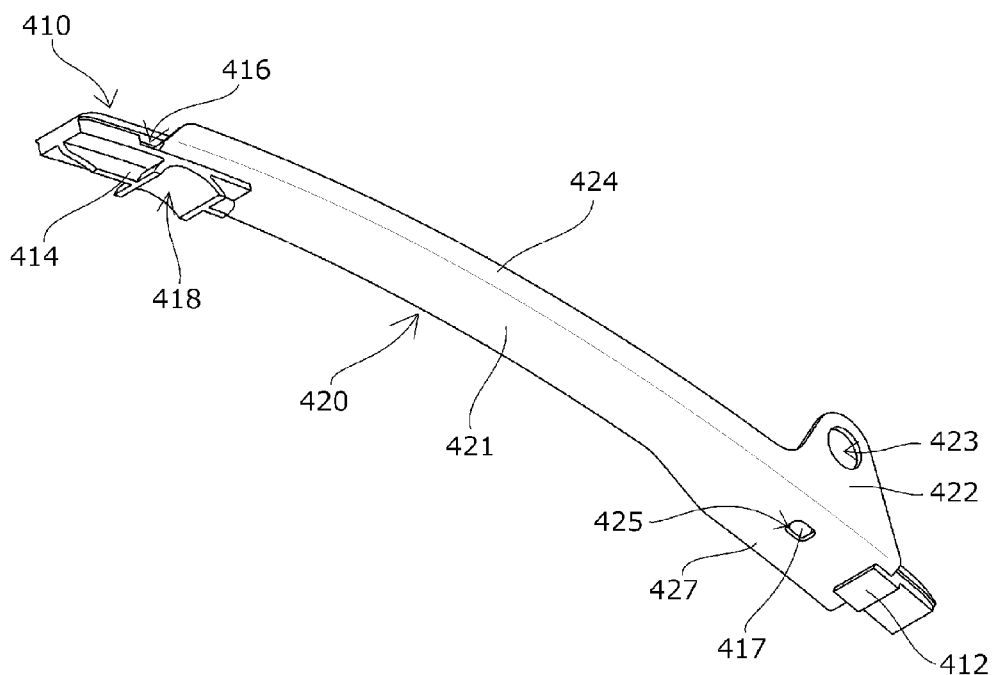
FIG. 14 is a perspective bottom view of the chain guide according to the fourth embodiment of the present invention.
Figure 15:
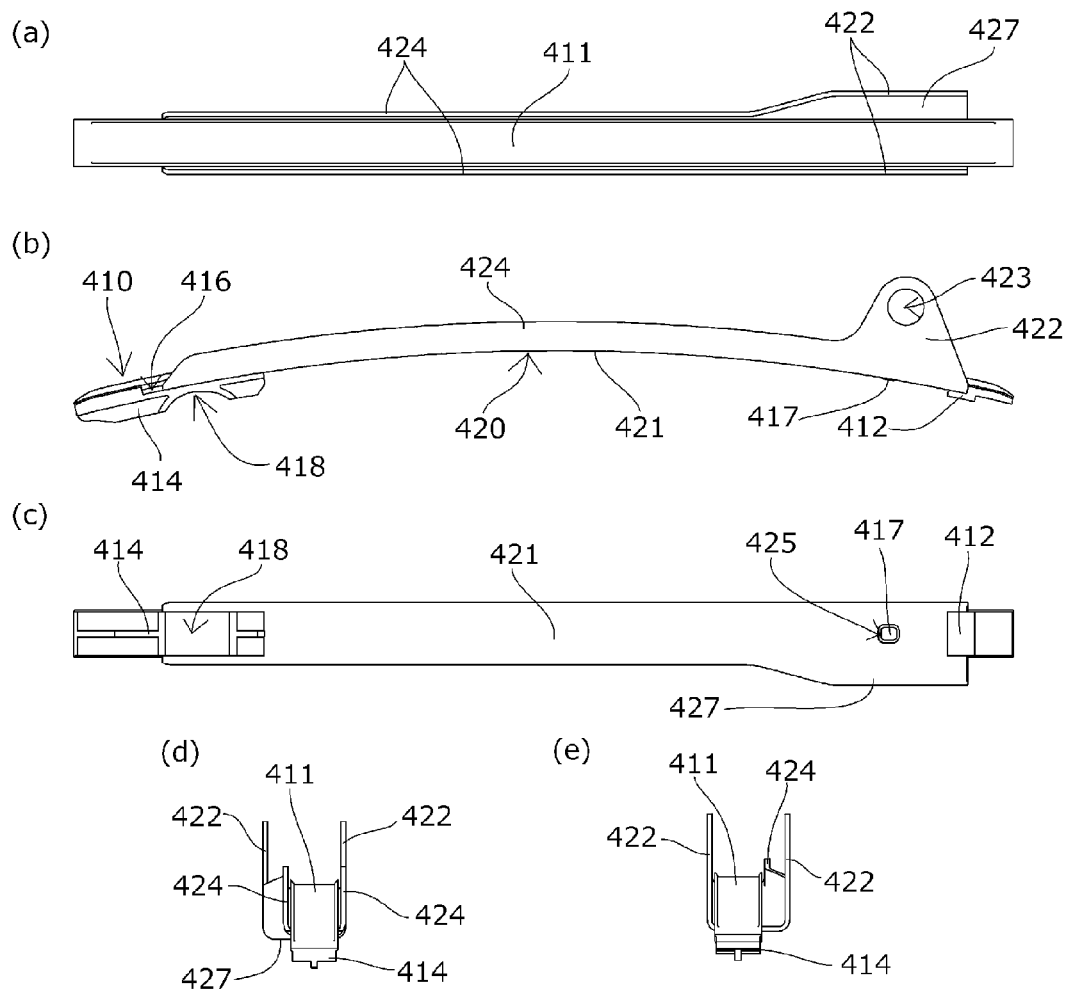
FIG. 15A, FIG. 15B, FIG. 15C, FIG. 15D, and FIG. 15E are respectively a plan view, a front view, a bottom view, a left view, a right view of the chain guide according to the fourth embodiment of the present invention.
Figure 16:
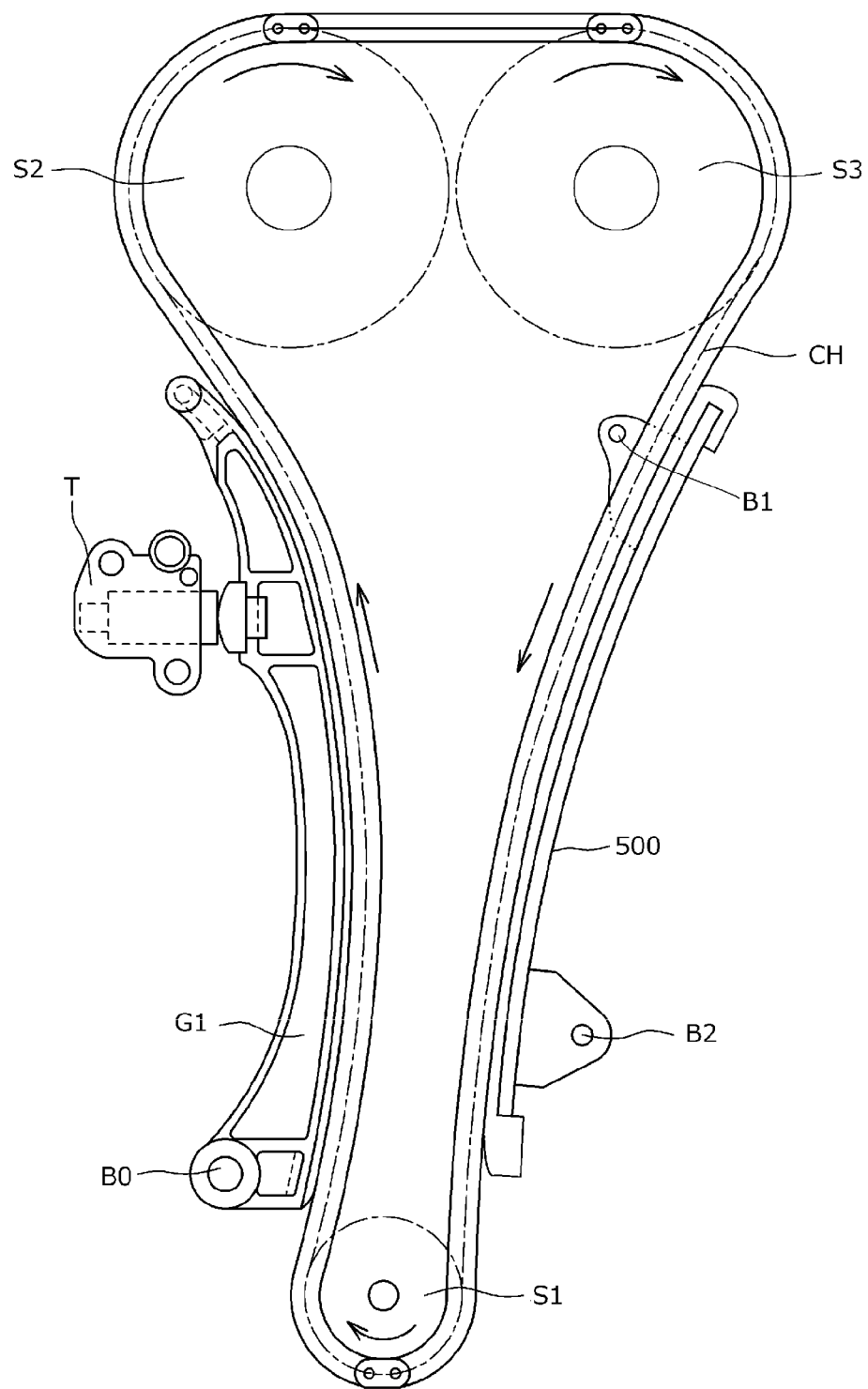
FIG. 16 is an explanatory drawing of the conventional timing system of an engine.
Figure 17:
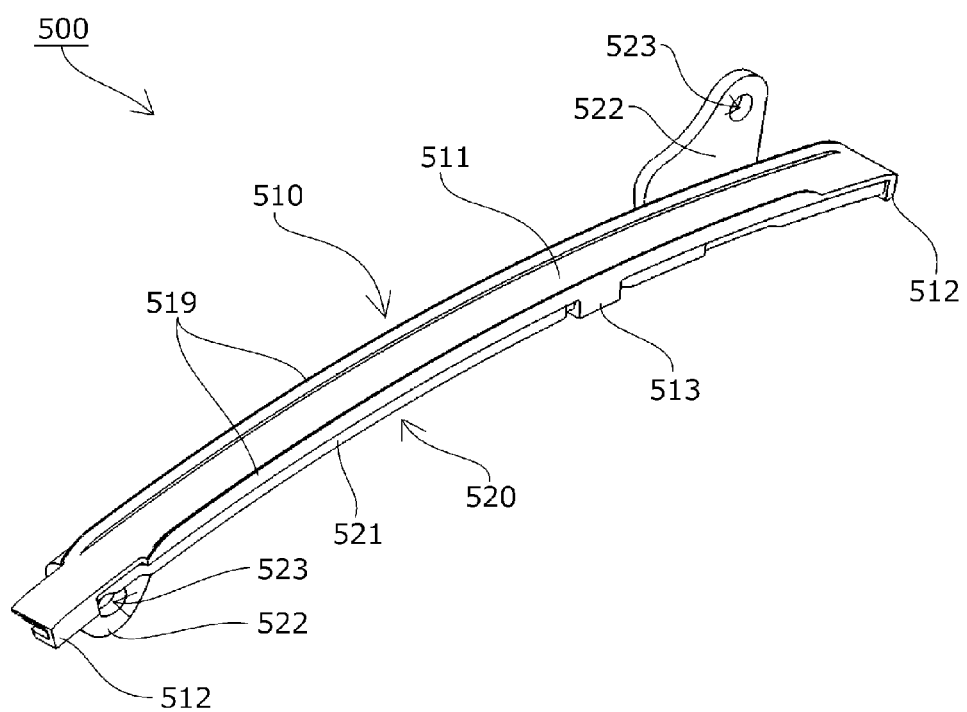
FIG. 17 is a perspective top view of the conventional chain guide.
Figure 18:
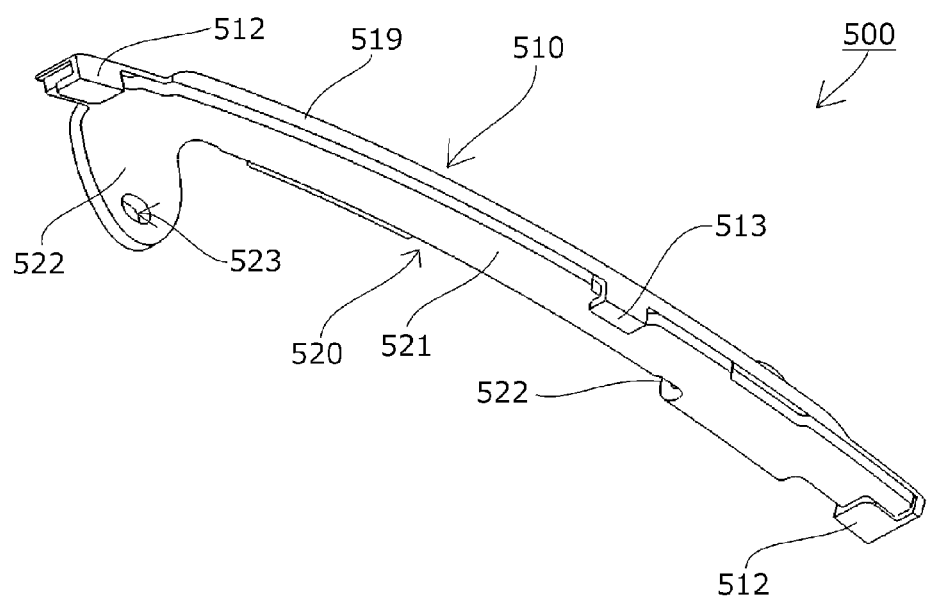
FIG. 18 is a perspective bottom view of the conventional chain guide.
Figure 19:
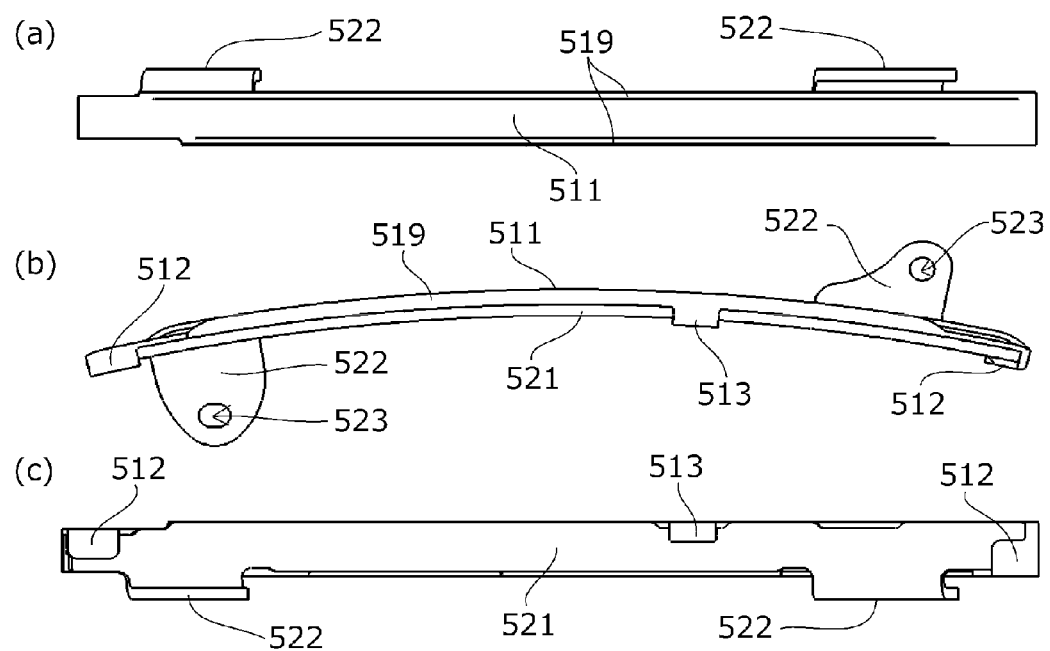
FIG. 19A, FIG. 19B, and FIG. 19C are respectively a plan view, a front view, and a bottom view of the conventional chain guide.

As shown in FIGS. 13 to 15, the chain guide 400 includes a guide shoe 410 slidingly guiding a running chain and a base member 420 supporting the guide shoe 410 along the chain running direction.

The base member 420 includes a shoe support portion 421 extending in the chain running direction, two parallel base mounting portions 422 extending vertically to the chain running direction from both sides in the width direction, and two parallel base wall portions 424 provided at both sides in the width direction. The base member is formed by punching from a single rolled steel sheet and then bending one base mounting portions 422 and base wall portions 424 at 90° with respect to the shoe support portion 421.

The base mounting portion 422 on the mounting surface side of the engine on which the mounting portion is to be mounted, from among the two base mounting portions 422, is formed by bending at 90° via a side extending portion 427 extending to the mounting surface side in a plane connected to the shoe support portion 421.

A mounting hole 423 for inserting a fixing member such as a pin for fixing inside an engine room is provided in each of the two parallel base mounting portions 422. The shoe support portion 421 is provided with a predetermined curved shape along the chain running direction.

The guide shoe 410 is constituted by a running guide portion 411 extending along the chain running direction, and a guide shoe mounting portion 414 extending perpendicular to the chain running direction at a position apart from the base mounting portion 422 in the chain running direction. The guide shoe is formed integrally, for example by injection molding, from a synthetic resin material.

The guide shoe mounting portion 414 is formed to extend to the rear surface side downstream of the running guide portion 411, provided with a mounting locking groove 418 that can be locked to the circumferential surface of a fixing member, such as a pin for fixing inside the engine room, and reinforced by a rib for maintaining strength and rigidity.

Similarly to the chain guide 100 according to the above-described first embodiment, the guide shoe mounting portion 414 is provided with a fitting groove 416 into which the shoe support portion 421 of the base member 420 can be inserted and fitted from the chain running direction. Furthermore, a locking projection 417 for engaging with an engagement hole 425 provided in the upper surface of the shoe support portion 421 and an end engagement piece 412 for engaging with the upstream end section of the shoe support portion 421 are provided at the rear surface side of the running guide portion 411. In a state in which the rear surface of the guide shoe 410 is supported by the base member 420, the two can be mated with each other to be displaceable in the chain running direction and detached from each other.

With the chain guide 400 according to the present embodiment that has the above-described configuration, the structural components same as those of the chain guide 100 according to the above-described first embodiment demonstrate the same operation effect. Further, even when the position of the mounting surface of the engine on which the mounting portion is to be mounted is offset in the width direction of the chain, the adjustment can be performed by the size of side extending portion 427 in the width direction, and this size is determined during punching from a rolled steel sheet. An additional operation such as subsequent multiple bending for offsetting the base mounting portion 422 after the punching is not required and the production is easy.

Further, since the guide shoe mounting portion 414 is locked and fixed to a portion of the circumferential surface of the fixing member such as a pin with the mounting locking groove 418, the mounting locking groove 418 can be miniaturized by shaping only to a height necessary for such locking and fixing, and the space occupied inside the engine room can be reduced.

The above-described embodiments are specific examples of the chain guide in accordance with the present invention, but the chain guide in accordance with the present invention is not limited thereto, various combinations of the guide shoes and base portions of the embodiments can be used, and the shapes, positions, dimensions, and mutual arrangements of the constituent members can be variously chained.

Further, the configurations of the above-described embodiments are to be provided inside an engine having a timing system, but such an application is not limiting and they can be used in various devices.

Furthermore, the present invention can be applied not only to chain-based transmission mechanisms, but also to similar transmission mechanism using belts, ropes, and the like, and can be used in various industrial fields.

What is claimed is:

1. A chain guide comprising: a guide shoe slidingly guiding a running chain; and a base member supporting the guide shoe along a chain running direction, the base member being constituted by a shoe support portion extending in the chain running direction and a base mounting portion extending perpendicular to the chain running direction, the guide shoe being constituted by a running guide portion extending in the chain running direction and a guide shoe mounting portion extending perpendicular to the chain running direction at a position apart from the base mounting portion in the chain running direction, the lower surface of the running guide portion is supported by the base member along the chain running direction, the base mounting portion is formed to extend to the upper surface side of the running guide portion, the guide shoe mounting portion is formed to extend to the lower surface side of the running guide portion, the base mounting portion and the guide shoe mounting portion being provided respectively only at a positions which do not overlap one another in the chain running direction, the chain guide further comprising base wall portions formed to sandwich the guide shoe from both sides in a width direction of the guide shoe, the base wall portions being provided at both sides, in the width direction, of the shoe support portion.

2. The chain guide according to claim 1, wherein the guide shoe is formed from a synthetic resin material; and the base member is formed from a metal material.

3. The chain guide according to claim 2, wherein the base member is constituted by an integral metal sheet; and the base mounting portion and base wall portions are formed by being bent at 90° with respect to the shoe support portion.

4. The chain guide according to claim 1, wherein the base mounting portions are provided parallel to each other at both sides in the width direction.

5. The chain guide according to claim 1, wherein a projecting mounting hole with an edge portion thereof projected in an insertion direction is provided in the base mounting portion.

6. The chain guide according to claim 1, wherein a mounting locking groove that can be locked to a circumferential surface of a fixing member, as represented by a pin, used for mounting is provided in the guide shoe mounting portion.

7. The chain guide according to claim 1, wherein the guide shoe and the base member are configured to be mateable to and detachable from each other.

8. The chain guide according to claim 1, wherein the guide shoe and the base member are mated to be displaceable with respect to each other in the chain running direction.

* * * * *